Feb. 26, 1963 A. B. ORNER 3,078,933
HORIZONTAL DRILLING APPARATUS
Filed Nov. 16, 1960 4 Sheets-Sheet 3

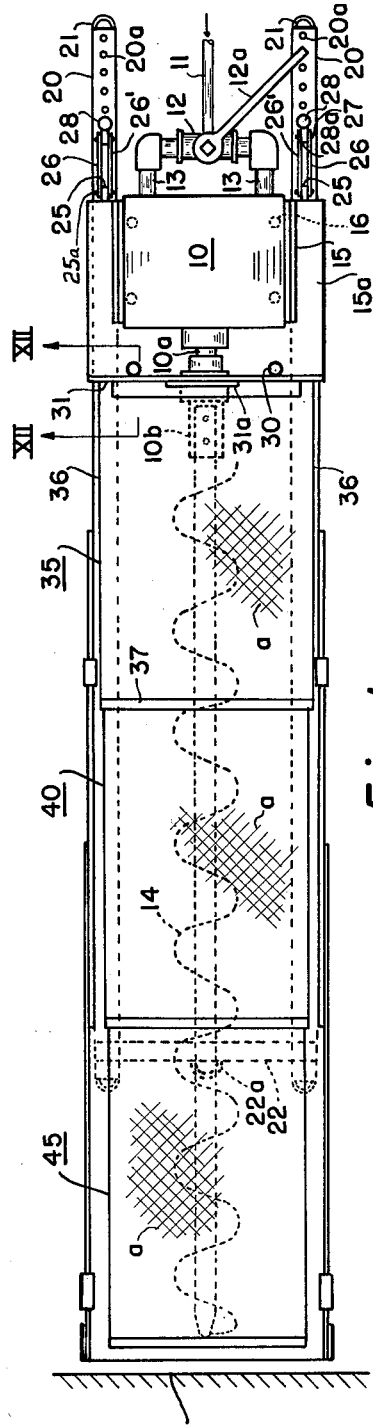
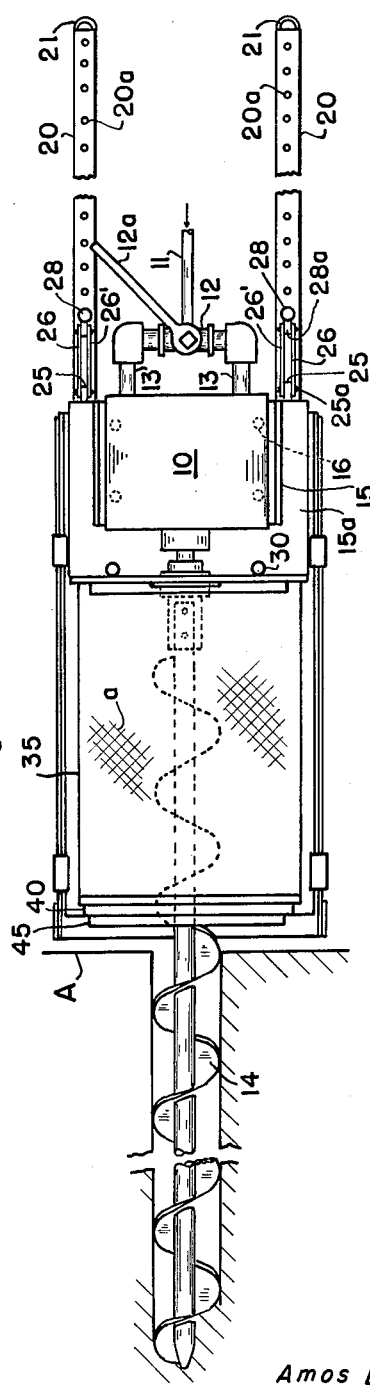

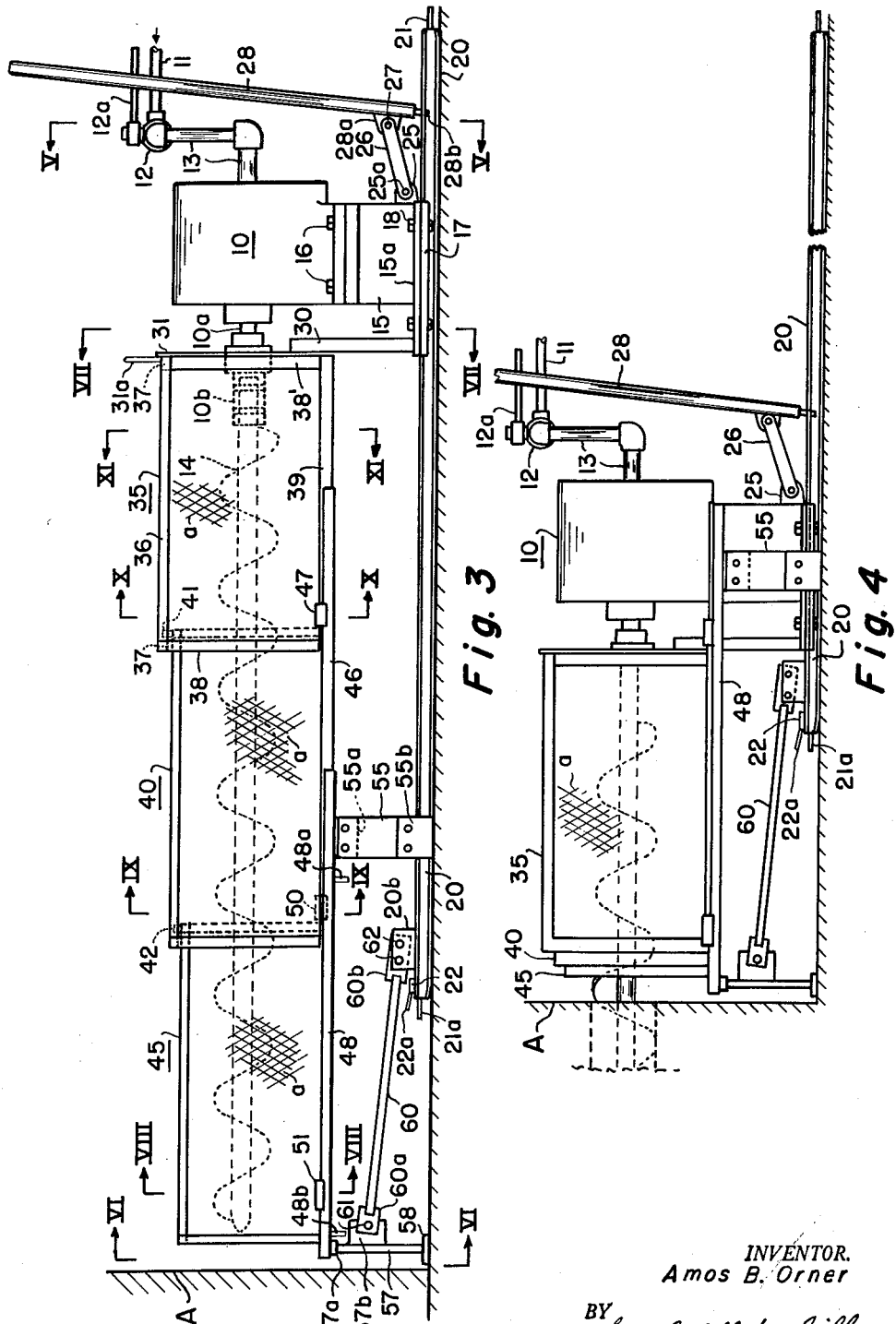

INVENTOR.
Amos B. Orner
BY
HIS ATTORNEYS

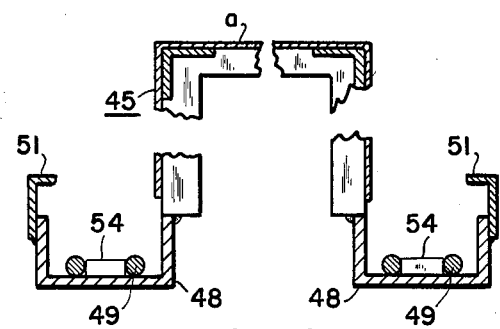
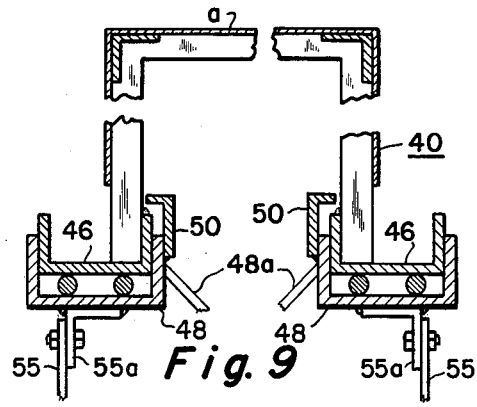
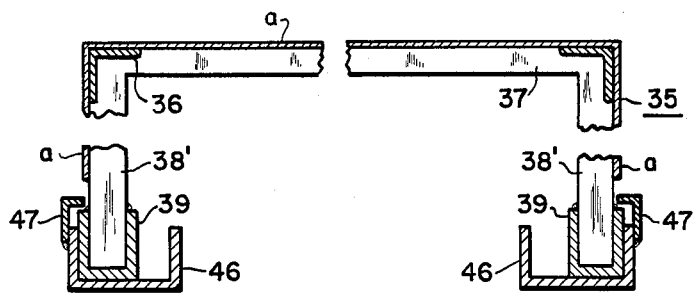
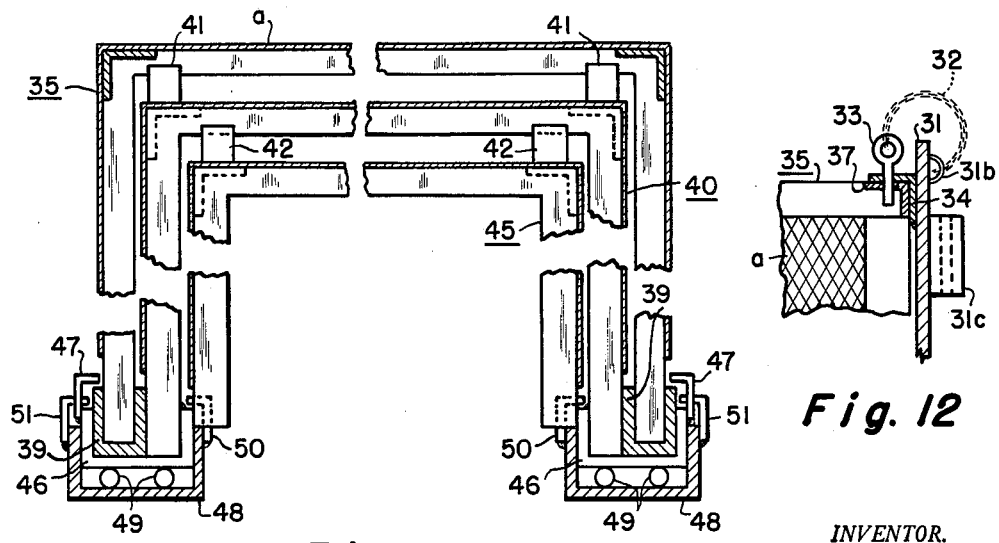

United States Patent Office 3,078,933
Patented Feb. 26, 1963

3,078,933
HORIZONTAL DRILLING APPARATUS
Amos B. Orner, Pittsburgh, Pa.
Filed Nov. 16, 1960, Ser. No. 69,596
10 Claims. (Cl. 175—219)

This invention relates to an apparatus or machine for ground or earth boring or drilling operations and particularly, to a so-called horizontal boring or drilling machine for a ground facing, which machine has an extensible and collapsible safety structure for protecting the drill and the operators during the drilling of holes, such as used for service pipe lines or conduits.

Horizontal drilling machines are employed to bore or drill-out holes in substantially vertical ground facings to receive conduit and pipe lines. Such machines may employ a relatively long drill which is adapted to be progressively advanced towards the drill facing as the drilling operation progresses and the hole is lengthened or deepened. In usual practice, the drill projects forwardly of a driving motor and is rotated at a relatively slow speed (e.g. 50 to 150 r.p.m.) while the stem is advanced towards the facing. It has been found that this exposed drill constitutes a safety hazard to the operators of the machine and also from the standpoint that it may be damaged or broken by the accidental falling of a tool or piece of metal upon it while it is in operation. The protection of such a drill and of the workman from it during its usage poses a problem by reason of the fact that such drill is, in effect, shortened as far as its exposed portions are concerned as the drilling operation progresses, and means must be provided for supporting the safety structure and, at the same time, coordinating its effective length or enclosing area with the drilling operation.

It has thus been an object of my invention to provide a solution to the problem of providing a practical means or structure for protecting the immediate rotating surface area of the drill at the start of and throughout a full drilling operation;

Another object has been to devise safety structure or apparatus that will be extensible to substantially the full length of the drill and its stem to, in effect, close it off at the start of the drilling operation, will have its own supporting means, and that will be substantially automatically, progressively collapsed as the drilling operation progresses to permit such operation to be carried out without interference;

A further object of my invention has been to devise a safety enclosing structure for a drill which may be used with different sizes and lengths of drills, and which will be made up of a group or series of floor or ground supported movable or sliding sections or cages that can be employed in such a manner as to provide full safety protection about the stem during its operation;

A still further object of my invention has been to devise a practical and efficient, skid-mounted, safety cage assembly for a horizontal drilling machine and particularly, for its drill and stem, and which may be used without interfering with normal drilling operations;

These and other objects of my invention will appear to those skilled in the art from the following description of my illustrative embodiment and from the claims.

In the drawings, FIGURE 1 is a longitudinal top plan view in elevation of apparatus of my invention showing its safety structure in a fully extended relationship;

FIGURE 2 is a view similar to FIGURE 1 showing the positioning of the parts of the apparatus of FIGURE 1 after the completion of a drilling operation wherein, parts of the apparatus have been advanced along its skid means toward the facing being bored, the drill stem has drilled a hole horizontally-backwardly from such facing, and safety cage parts have been slid into a substantially full collapsed relationship;

FIGURE 3 is a longitudinal side view in elevation of the apparatus and on the scale of FIGURE 1 in the initial position of such figure;

FIGURE 4 is a longitudinal side view in elevation of the apparatus and on the scale of FIGURE 2 in the position of such figure;

FIGURES 8, 9, 10 and 11 are somewhat fragmental enlarged sections on the scale of FIGURES 6 and 7 and taken, respectively, along the lines VIII—VIII, IX—IX, X—X, and XI—XI of FIGURE 3;

Figure 5:
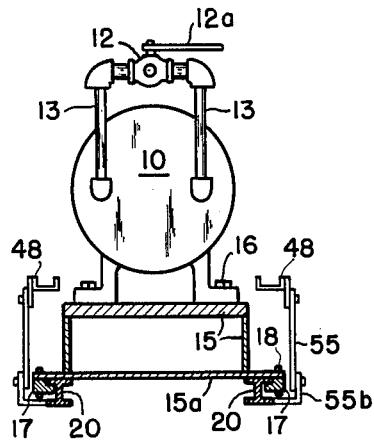
FIGURE 5 is a vertical end section on the scale of and taken along the line V—V of FIGURE 3.

And, FIGURE 12 is a somewhat fragmental vertical top corner section on the scale of FIGURES 6 to 11, taken along the line XII—XII of FIGURE 1, and showing key means for removably latching or locking a back end cage with respect to the frame or mounting of a drill-actuating or driving motor.

Referring particularly to FIGURES 1 to 4, inclusive, I have shown a drilling apparatus or machine having a rotating fluid or air motor 10 that is carried by its mounting on a skid or skid frame having a pair of transversely spaced-apart longitudinal side members or rails 20. The motor mounting is shown positioned for longitudinal sliding movement along the rails 20, as effected by a pair of pivotally-mounted handles or arms 28. It will be noted that the arms 28 are adapted to be progressively advanced along graduated slots or openings 20a in the skid members 20 to advance the motor as the drilling operation progresses.

The motor 10 has a shaft 10a and a coupling or chuck 10b to receive a rotary or spiral drill stem 14 of a suitable length that is to be advanced horizontally into a ground facing A. The front portion of the skid frame carries a group or series of cages or cage parts 35, 40 and 45. The primary or back cage 35 may be locked to an upright end frame of the motor mounting prior to the start of the drilling operation, see FIGURE 12.

To effect a drilling operation, depending upon the length of the drill stem 14, the forward or tertiary cage 45 may be slightly collapsed or slid into the secondary or intermediate cage 40 and the motor 10 started. As the drilling operation progresses, the cage part 45 continues to abut the facing A and the cage part 35 advances forwardly with the motor mounting, moving the cage part 35 forwardly over and to receive the part 40 in a telescopic relation therein, and tending to move the cage part 40 forwardly over and to receive the part 45 in a telescopic relation therein. At the completion of the drilling operation, as illustrated by FIGURES 2 and 4, the three cage parts may be in a fully collapsed relationship; this, of course, will depend on the desired length of the hole being drilled. As a result, the drill stem 14 is enclosed by cage parts throughout the drilling operation, although it is fully free to effect such operation without interference.

Referring particularly to FIGURES 1 and 5, the motor 10 may be a conventional type of rotary fluid or air motor, as actuated by fluid under pressure introduced through pipe 11, a control and shut-off valve 12, and branch piping 13. The valve 12 has a control arm 12a for moving it between maximum positions, as represented by a completely closed position to a completely open position, and to intermediate speed-control positions. The casing or housing of the motor 10 is secured on a vertical mounting 15 by bolts 16. As will be noted particularly in FIGURE 5, the mounting 15 has a bottom plate member 15a which is shown adapted to slidably rest upon the top flanges of the pair of transversely spaced-apart skid rail members 20 of I-beam shape. A pair of longitudinally-extending, side-mounted, angle-shaped, slide-guides 17 are shown secured by bolts 18 to project downwardly from adjacent outer sides of the plate member 15a and to engage under outer portions of the top flanges of the skid rail members 20. In this manner, the mounting 15 is retained in position with respect to the skid rails 20, but may be slid longitudinally therealong.

At the start of a drilling operation, the motor 10 and its mount 15 will be positioned closely adjacent the right-hand end of the apparatus of FIGURES 1 and 3 with, for example, pin ends 28b of the lever arms 28 within end eyelets or hand grips 21 that are provided at the back end of each skid radial 20. The mount 15 has a pair of transversely spaced-apart ears or lugs 25 which project backwardly therefrom to receive ends of side-positioned pairs of operating levers 26 and 26' that extend therefrom. As shown in FIGURES 1 and 2, the pairs of levers 26 and 26' are mounted at one end by pivot pins 25a on an associated ear 25 and, at their other ends, on a lug or ear 28a of an associated operating arm 28 by a pivot pin 27. It will thus be apparent that, as the drilling operation progresses, the arms 28 may be lifted out of one set of corresponding, transverse-aligned slot graduations 20a of the skid rails 20 to a next forward set to thus progressively advance the motor 10 and its mounting assembly in a step-by-step relation forwardly along these rails as the drilling operation progresses.

Figure 7:
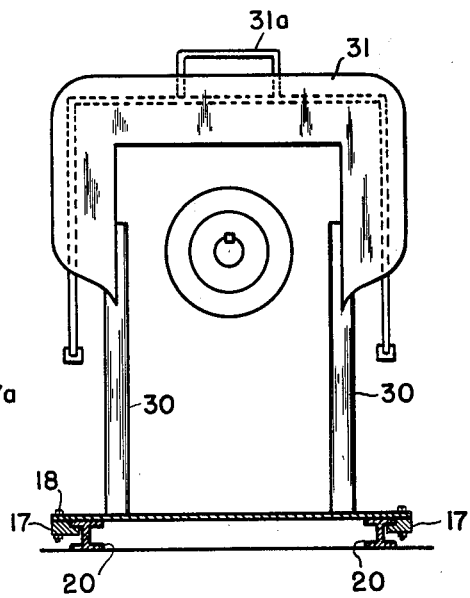
FIGURE 7 is an end section of the slightly enlarged scale of FIGURE 6 and is taken along the line VII—VII of FIGURE 3.

As shown particularly in FIGURES 1 to 4, inclusive, and 7, an up-standing, rectangular or U-shaped frame is secured to the front end of the plate member 15a to project upwardly therefrom. This frame consists of transversely spaced-apart vertical side pieces 30 and a top collar piece or portion 31 which is secured thereto, as by welding. If desired, a handle or lift grip 31a may be secured, as shown in FIGURES 3 and 7, to project upwardly from a back cross frame member 37, so that the cage assembly may be manually pulled backwardly to an extended relationship.

The primary or largest size cage part 35 is adapted to extend forwardly from the motor frame portions 30 and 31, as shown particularly in FIGURE 3. This cage part 35 (see FIGURES 1 and 7) comprises a pair of transversely spaced-apart horizontal or longitudinally-extending, upper side frame members or pieces 36, upper front and back cross frame members or pieces 37, front and back pairs of vertical frame members or pieces 38 and 38', and bottom horizontal or low side frame channel members or pieces 39. All of these members define a rectangular frame which may be covered about its top and longitudinal sides by protective grating a of wire mesh or slotted metal or by plastic material that is transparent or translucent, so that the operation of the drill may be viewed during a drilling operation. It will be seen (FIGURES 6 and 7) that considerable clearance exists between the drill stem and the surrounding cages, so that the drill stem is surrounded in a loosely or widely spaced relationship by the cage enclosure to provide for different sizes and types of drill stems and to give maximum protection to the operators and the stem.

Referring particularly to FIGURE 12, the motor frame portion 31 is shown provided with a cross angle member or piece 34 which is adapted to receive a back end, top cross angle member 37 of the cage 35 in a slidable, interfitting relationship therewithin. A locking key or pin 33 is carried by an eyelet 31b and a flexible chain 32, and is adapted to be positioned within a slotted key holder 31c when the cage 35 is to be removed. The key 33 is adapted to extend through aligned holes in the members 34 and 37 when the cage 35 is to be locked in a secured relation to the motor frame or mounting, as when a drilling operation is to be started.

The cages 40 and 45 are of the same general construction as the cage 35. However, the cage 40, at its inner end, carries an upwardly-projecting stop lug 41 (see FIGURE 3) that is adapted to strike against the forward member 37 of the cage 35 to limit the maximum outward extension of the cage 40 with respect thereto. The cage 45 has a similar lug 42 that is adapted to engage a similar upper cross member of the cage 40 to limit its maximum outward extension with respect thereto.

As shown particularly in FIGURES 1 and 10, the bottom side framing members 39 are of upwardly-open, channel-shape and are adapted to slide along a pair of wider, upwardly-open, longitudinally-extending channel members 46 that, as shown in FIGURE 9, constitute the bottom side framing members of the secondary cage 40. Angle-shaped lugs 47 (see FIGURES 10 and 11) are secured to project upwardly from the channel members 46 to ride along the top edges of the members 39 to thus guide the movement of the cage part 35 along the cage part 40.

The front or tertiary cage 45, as shown particularly in FIGURES 8 and 11, has a pair of upwardly-open, channel-shaped, bottom side guide members 48 that are secured to project transversely-outwardly therefrom and to receive suitable bearing, such as longitudinally-projecting, rod-like slide bearings 49 therein. The channel members 46 of intermediate or secondary cage 40 are shown adapted to rest upon the bearings 49 for sliding movement therealong, see FIGURE 9. A pair of inside-positioned, angle-shaped, guide lugs 50 are welded to project upwardly from the channel members 48 (see FIGURES 9 and 11) and to ride along the upper, inner edges of the channel members 46. Similar guide lugs 51 (see FIGURES 8 and 11) are welded to project upwardly from the outer sides of the channels 48 and to ride along the upper edges of the outer side portions of the channel members 46. In addition, the channels 46 carry outer guide lugs 47 (see FIGURES 10 and 11) of the same general construction that are welded thereto and are adapted to ride along upper edges of the outer sides of the channel members 39 of the cage 35.

Figure 6:
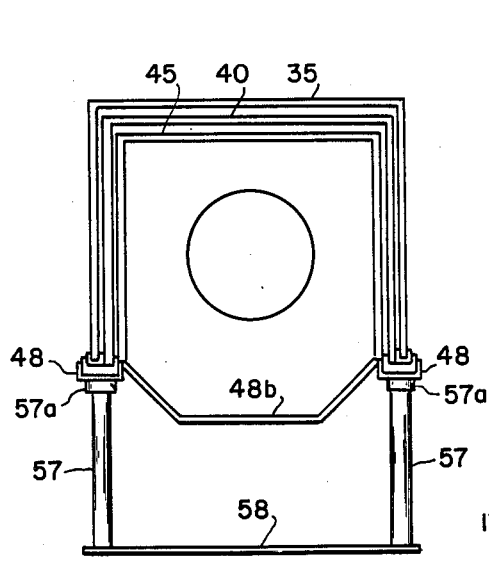
FIGURE 6 is an end section on a slightly enlarged scale with respect to and taken along the line VI—VI of FIGURE 3.

It may thus be seen that the cage 45 carries bottom side channels 48 that telescopically and movably or slidably receive bottom side channels 46 of the secondary cage 40, and that the bottom side channels 46 of the secondary cage 40 movably or slidably telescopically carry the bottom side edge channels 39 of the primary cage 35. Thus, the channels 48, 46, 39 provide a slidable mounting on the skid rails 20 for the cage members 45, 40, 35 that maintains these cage members in a mutually interspaced and free relation with respect to each other, as is shown in FIGURES 6 and 11. Since there is no sliding contact between the cage members, as such, internal friction and thus, the collapsing and expanding force required for operating the cage assembly is minimized. As shown in FIGURE 8, the slide rollers 49 may be retained in a separated relationship with respect to each other by one or more sets of spacer lugs 54 that project upwardly from the channels 48. The front end portions of the cages 40 and 45 may, as shown in FIGURES 3, 6 and 9, be provided with cross connecting, downwardly-offset or U-shaped cross reinforcing members 48a and 48b to strengthen their construction and space the channels 48, without interfering with the telescopic movement of the cages with respect to each other (see FIGURES 3 and 9). If desired, rollers may be employed for moving the cages with respect to each other along the guide members or channels.

As disclosed particularly in FIGURES 3 to 5, the back end portions of bottom guide channels 48 of the tertiary or front cage 45 may be securely carried on forward end portions of the skid rails 20 by vertical side legs 55.

These legs, as shown, are, at their upper ends, secured by angle pieces 55a to the front end portions of the respective side channels 48 and, at their lower ends, are secured by angle pieces 55b to associated skid rails 20.

The front end of the forward cage 45 is provided with a pair of upwardly-projecting legs 57 (see FIGURES 1 and 6) which are secured by collars 57a to the front end portions of its bottom guide rails 48. The legs 57, at their lower ends, are secured to a transverse front skid member 58 which is adapted to rest on the same floor level as the skid rails 20. Each leg 57 is provided with a backwardly-projecting lug 57b to which a connecting rod 60 is secured by a mount 60a and a mounting pin 61. The other end of the rod 60 is secured by a mount 60b and mounting pins 62 to an upwardly-projecting mounting lug 20b of an associated one of the skid rails 20. The connecting rods 60, in addition to strengthening the front legs 57, serve to support them on the plane of the skid when the floor or ground bed level falls off or has a cavity beneath such legs. The rods 60 may be removed by removing the mounting pins 61 and 62.

The front end of the skid rails 20 is shown connected by a transverse member 22, see FIGURES 1 and 3, so that they constitute a skid frame. The connecting members 60 secured thereto make the legs 57 of the cage 45 a part thereof. In FIGURE 3, the front end of the skid rails 20 is shown provided with handling hooks 21a, and the cross member 22 is shown provided with a centrally-disposed handle 22a.

At the start of a drilling operation, the front or tertiary cage 45 is placed with its front face in abutment with the earth facing A to be drilled, and is retained in such a position throughout the drilling operation. The drilling operation may be initiated by opening the valve 12, and the motor frame and the cages 35 and 40 may then be advanced towards the cage 45 until the end of the drill 14 enters the ground facing. This is done by advancing the arms 28 within the slots 20a of the skid members 20.

When the drilling operation is started, then the operators will progressively advance the motor 10 and its frame as well as the primary and secondary cages 35 and 40 forwardly, as needed, by placing the pins 28b of the arms 28 in forwardly-advanced slots 20a. FIGURES 1 and 3 show the fully-advanced or extended positions of the cages, and FIGURES 2 and 4 show the fully telescopically-collapsed relationship of the cages. After the completion of the drilling operation and the drill stem rotation has been stopped by shutting-off the valve 12, the apparatus may be again extended to the position of FIGURES 1 and 3 by advancing the back parts backwardly along the skids 20. In this connection, the arms 28 act as lever arms for effecting backward and forward movement, as controlled by the limits of movement prescribed by a given set of slots 20a.

When about two-thirds of the length of the drill or bit 14 has been advanced into the facing A, as evidenced by the substantially complete collapse of the cage assembly (see FIGURES 2 and 4), an additional drill length (or sectioned length) may be secured by conventional couplings between the back end of the stem of the drill 14 and the motor shaft after the motor mounting has been unlatched from the cage 35 and the motor mounting has been moved to its extreme back or starting position. Then, the cage assembly can be extended over the new full length of the drill by pulling backwardly on the handle 31a. When the cage 35 is again secured to the collar 31 by the means of FIGURE 12, the forward drilling operation may be continued. These steps may be repeated until a requisite or desired length of hole has been provided, at which time, the drill and any extended lengths thereof are withdrawn, the machine is moved to a new location, and the operations are repeated.

What I claim is:

1. In a machine for drilling substantially horizontally into a ground facing wherein the machine has a longitudinal skid and a motor, the motor has a mounting positioning it on the skid for progressive advancing movement therealong and has a chuck to receive a longitudinal drill to project forwardly thereof, and the motor is adapted to rotate the drill and progressively advance it into the ground facing for forming a hole therein; a safety structure which comprises, a series progression of cages positioned on the skid to project longitudinally-forwardly of the motor mounting and define an enclosure along the drill, means mounting said cages on the skid in a mutually interspaced and movable telescopic relation with each other, and means cooperating with the skid and the ground facing to progressively move said cages from an extended relation towards a telescopically-collapsed relation when the motor mounting is being advanced along the skid and the drill is being advanced into the ground facing.

2. In a machine as defined in claim 1 wherein, position limit means is carried by the motor mounting, and a back one of said cages is adapted to fit against said position limit means, and latch means removably secures said back cage to said position limit means during the drilling operaton.

3. In a machine for drilling substantially horizontally into a ground facing wherein the machine has a longitudinal skid to rest on a floor level and has a motor, and the motor has a mounting positioning it on the skid for progressive longitudinal advancing movement therealong, has a chuck to receive a longitudinal drill stem to project forwardly thereof, and is adapted to rotate the drill stem and progressively advance it into the ground facing for forming a hole therein; a safety structure which comprises, a cooperating group of cages movably-positioned in a mutually interspaced relation with respect to each other to project along the skid longitudinally-forwardly of the motor mounting and define a loosely surrounding enclosure along the drill stem, means mounting a back cage of said group in a secured relation with the motor mounting for advancing movement therewith, means carried by a front one of said cages to abut against the facing and move the other cages of said group towards a closed relation with each other during the progressive longitudinal advancing movement of the motor along said skid.

4. In a machine for drilling substantially horizontally into a ground facing wherein the machine has a longitudinal skid to rest on a floor level and has a motor, and the motor has a mounting positioning it on the skid for progressive longitudinal advancing movement therealong, has a chuck to receive a longitudinal drill stem to project forwardly thereof, and is adapted to rotate the drill stem and progressively advance it into the ground facing for forming a hole therein; a safety structure which comprises, a slidably interfitting group of substantially rectangular cages, each having only three enclosed sides, means securing said group of cages at one end to the motor mounting for progressive advancing movement therewith, and means associated with a front one of said cages to position it in a substantial stationary relationship with respect to the skid, so that the other cages of said group will be advanced forwardly into a collapsed relationship with respect to said forward cage when the drill stem is progressively advanced forwardly into the facing for forming a hole therein.

5. In a machine as defined in claim 4 wherein, said cages include mesh walls along their top and side portions, and means guidably connects said cages in a slidably-movable expansible and collapsible relationship with respect to each other.

6. In a machine as defined in claim 5 wherein, said guidable connecting means has means for retaining said cages in a connected relationship with respect to each other during their slidable movement with respect to each other, the skid has slotted portions progressively therealong, means is carried by the motor mounting to engage progressively forwardly-advanced slotted portions of the skid for advancing the motor and drill forwardly towards the facing as the drilling operation progresses, and a back cage of said group is engaged by the motor mounting to progressively advance said group of cages forwardly towards a forward one of said cages during the drilling operation.

7. A safety structure for a longitudinally-forwardly extending motor-driven drill stem to be advanced into a ground facing for forming a hole therein which comprises, an interfitting group of cages disposed in an extended enclosing relation along the drill stem, guide channels along opposite sides of said group of cages slidably-guidably mounting the cages for movement with respect to each other, and means for slidably-moving the cages of said group into a shortened interfitting relationship as the drill stem advances into the ground facing during a drilling operation.

8. A safety structure as defined in claim 7 wherein, a forward one of said group of cages has a stand projecting therefrom and adapted to abut the ground facing during the slidable movement of the cages into the shortened interfitting relationship.

9. In a machine for drilling substantially horizontally into a ground facing wherein the machine has a longitudinal skid and a motor, the motor has a mounting positioning it on the skid for progressive advancing movement therealong and has a chuck to receive a longitudinal drill to project forwardly thereof, and the motor is adapted to rotate the drill and progressively advance it into the ground facing for forming a hole therein; a safety structure which comprises, a series progression of cages positioned on the skid to project longitudinally-forwardly of the motor mounting and define an enclosure along the drill, a plurality of side rails, at least one rail per cage, each side rail being carried by a corresponding cage, said side rails being mutually slidable with respect to each other to slidably support said cages, means cooperating with the skid and the ground facing to progressively move said cages from an extended relation towards a telescopically-collapsed relation when the motor mounting is being advanced along the skid and the drill is being advanced into the ground facing, and limit means associated with said cages to limit the maximum extension of said cages with respect to each other.

10. In a machine for drilling substantially horizontally into a ground facing wherein the machine has a longitudinal skid and a motor, the motor has a mounting positioning it on the skid for progressive advancing movement therealong and has a chuck to receive a longitudinal drill to project forwardly thereof, and the motor is adapted to rotate the drill and progressively advance it into the ground facing for forming a hole therein; a safety structure which comprises, a series progression of cages positioned on the skid to project longitudinally-forwardly of the motor mounting and defining an enclosure along and in an outwardly spaced relation with respect to the drill, means mounting said cages in a movable telescopic relation with each other, means cooperating with the skid and the ground facing to progressively move said cages from an extended relation toward a telescopically-collapsed relation when the motor mounting is being advanced along the skid and the drill is being advanced into the ground facing; said last named means comprising, a leg structure projecting downwardly from a front one of said cages to rest on the same floor level as the skid, and means securing said leg structure to a forward end portion of the skid whereby the collapse of said cages with respect to each other is effected by advancing other cages of said series forwardly with respect to said front cage.

References Cited in the file of this patent

UNITED STATES PATENTS

| | | |
|---|---|---|
| 1,249,070 | Green | Dec. 4, 1917 |
| 1,932,068 | Englebright et al. | Oct. 24, 1933 |
| 2,470,974 | Boydstun | May 24, 1949 |
| 2,506,988 | Beltz | May 9, 1950 |

FOREIGN PATENTS

| | | |
|---|---|---|
| 15,931 | Great Britain | 1913 |